US010260002B2

(12) United States Patent
Vasicek

(10) Patent No.: US 10,260,002 B2
(45) Date of Patent: Apr. 16, 2019

(54) DEVICE FOR THE CONTINUOUS THERMAL PROCESSING OF USED OR OTHERWISE DEGRADED TYRES

(71) Applicant: ALPAJAR GROUP s.r.o., Orlova, Poruba (CZ)

(72) Inventor: Alois Vasicek, Golcuv Jenikov (CZ)

(73) Assignee: Alpajar Group S.R.O., Orlova, Poruba (CZ)

( * ) Notice: Subject to any disclaimer, the term of this patent is extended or adjusted under 35 U.S.C. 154(b) by 88 days.

(21) Appl. No.: 15/319,177

(22) PCT Filed: Aug. 6, 2015

(86) PCT No.: PCT/CZ2015/000087

§ 371 (c)(1),
(2) Date: Dec. 15, 2016

(87) PCT Pub. No.: WO2016/019932

PCT Pub. Date: Feb. 11, 2016

(65) Prior Publication Data

US 2017/0166817 A1 Jun. 15, 2017

(30) Foreign Application Priority Data

Aug. 7, 2014 (CZ) .................................... 2014-534

(51) Int. Cl.
*C10B 49/02* (2006.01)
*C10B 53/07* (2006.01)
(Continued)

(52) U.S. Cl.
CPC .............. *C10B 49/02* (2013.01); *C10B 53/07* (2013.01); *C10G 1/10* (2013.01); *C10K 1/04* (2013.01); *C10K 1/026* (2013.01); *Y02P 20/143* (2015.11)

(58) Field of Classification Search
CPC ......... C10B 49/02; C10B 49/10; C10B 53/07; C10G 1/10; C10K 1/04
See application file for complete search history.

(56) References Cited

U.S. PATENT DOCUMENTS 3,582,279 A * 6/1971 Beckman et al. ....... C10B 49/02 106/472
4,452,154 A * 6/1984 Kono ...................... B29B 17/04 110/256

(Continued)

FOREIGN PATENT DOCUMENTS

CZ 20795 U1 4/2010
JP S55 160087 A 12/1980

(Continued)

OTHER PUBLICATIONS

Grub, J. et al. (2012) "Butadiene" in Ullmann's Encyclopedia of Industrial Chemistry, 6, 381-396.*

(Continued)

*Primary Examiner* — Brian A McCaig
(74) *Attorney, Agent, or Firm* — Hovey Williams LLP

(57) ABSTRACT

The device for the continuous processing of used or otherwise degraded tires consists of a reactor (1) for the thermal decomposition of these waste tires into the organic decomposition products in the form of low molecular hydrocarbons, and residual inorganic waste shares. In the upper part of the reactor (1) there is created a filling chamber (2) with a pair of filling closures (3) for filling its internal space by the waste tires and in the bottom part of the reactor (1) there is formed the output chamber (8) of the residual inorganic shares with a pair of output closures (9), while in the lower part of the reactor (1) there are arranged the nozzles (5) for generating of a mild gaseous inert medium by oxidation of unreacted residues of organic matter from the processed tires. In the upper part of the inner space of the reactor (1) under the filling chamber (2) is then created at least one output opening (11) of this inert gas media, which, together with the therein dispersed organic decomposed products in
(Continued)

the form of aerosol, is led through the separator (12) of solid particles and a cooler (17) into a separator (10) of liquid particles from the cooled aerosol which is equipped with the first end output (21) of the liquid particles into the tank (22) and, second, between-operating output (23) of the gaseous particles, which are led to the direct energy use by combustion in thermal machines or in a convenient implementation they are driven Into the freezing chamber (24) for the separation of gases with a condensing temperature above the temperature in this chamber. From freezing chamber (24) there is ended up the second end output (25) of one part in it non-condensed gases and the third end output (26) of the remaining part in it non-condensed gases.

4 Claims, 1 Drawing Sheet

(51) Int. Cl.

| | |
|---|---|
| ***C10G 1/10*** | (2006.01) |
| ***C10K 1/04*** | (2006.01) |
| *C10L 1/04* | (2006.01) |
| *C10K 1/02* | (2006.01) |

(56) References Cited

U.S. PATENT DOCUMENTS

| | | | |
|---|---|---|---|
| 4,746,406 | A | 5/1988 | Timmann |
| 5,735,471 | A | 4/1998 | Muro |
| 2011/0116986 | A1 | 5/2011 | Balint et al. |

FOREIGN PATENT DOCUMENTS

| | | |
|---|---|---|
| JP | H06 7766 A | 1/1994 |
| WO | 93/20396 | 10/1993 |

OTHER PUBLICATIONS

International Search Report and Written Opinion in Corresponding PCT/CZ2015/00087 dated Nov. 20, 2015 (9 pages).

* cited by examiner

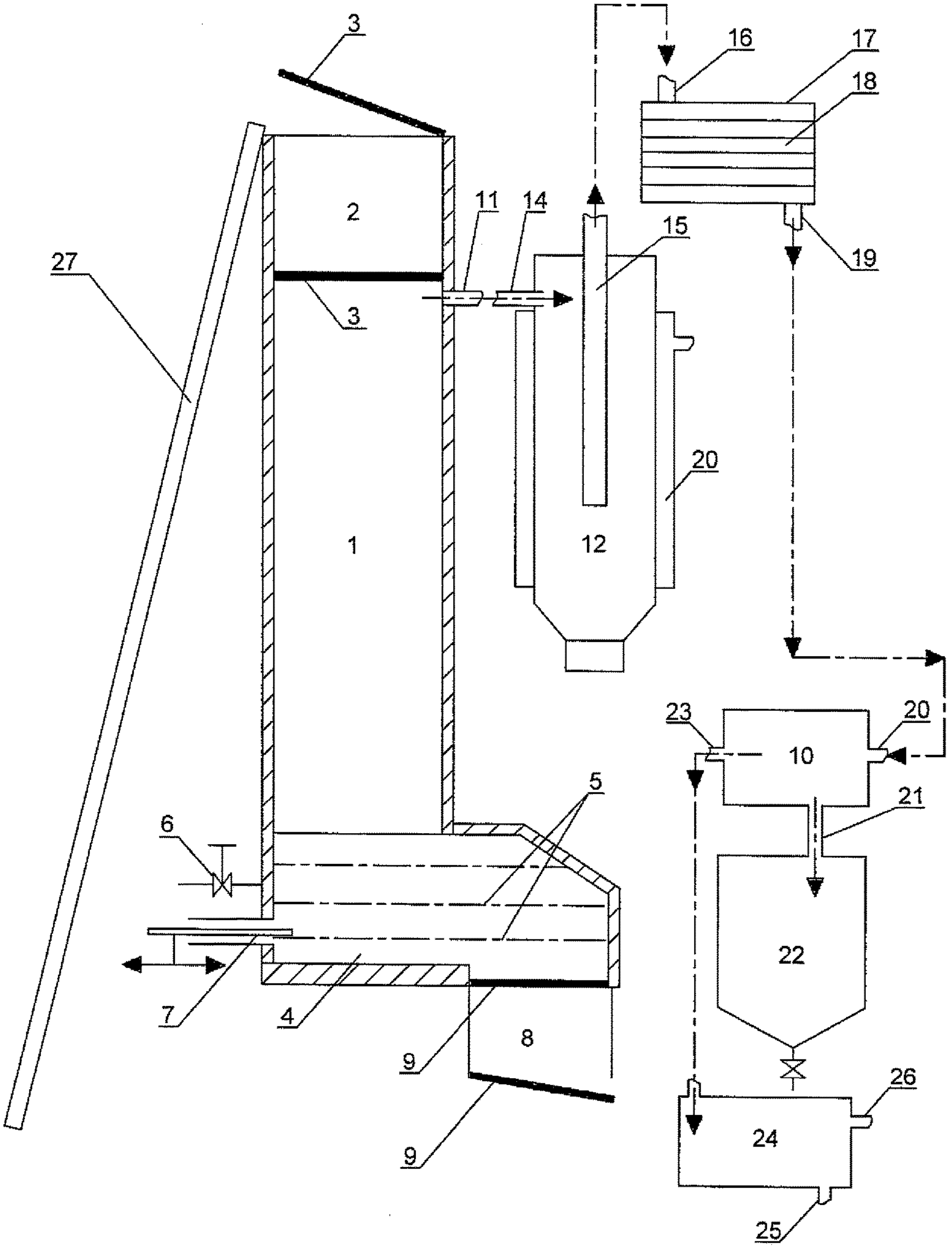
3
2
11
14
15
16
17
18
19
27
3
20
1
12
23
20
10
21
5
6
22
7
4
9
8
9
26
24
25

DEVICE FOR THE CONTINUOUS THERMAL PROCESSING OF USED OR OTHERWISE DEGRADED TYRES

RELATED APPLICATIONS

This application is the National Stage of International Patent Application No. PCT/CZ2015/000087, filed Aug. 6, 2015, which is hereby incorporated by reference in its entirety, and which claims priority to Czech Application No. PV 2014-534, filed Aug. 7, 2014.

FIELD OF THE INVENTION

The invention relates to a device for the continuous thermal processing of used or otherwise degraded tyres into fuel oil, heating gases and into non-recyclable steel.

BACKGROUND OF THE INVENTION

The expert estimates in the issue of the occurrence of used tyres reported their annual number to 700 million pieces of discarded tyres. The issue of their processing is solved throughout the duration of their use, but so far the results of the solution have not come into the capacity level of their occurrence. Used tyres, therefore, cumulate and become the environmental problem. The currently known technologies focus on the areas, of which the historically first appears to be the regeneration of the rubber by the action of super-heated water vapour. The output is the so-called regenerate, which is used to additions into the rubber composition. Its production and the limited number of features compared to the original rubber, from which they arose, however, restrict this technology on a massive spread. The other direction in the technology of tyre processing is focused on the acquiring of rubber grit, which found its application/use in construction and in other areas, such as agriculture or engineering production. From these technologies are relatively well known the technologies using super-cooling of liquid nitrogen, when the rubber becomes fragile and then, in this state, it is disintegrated usually, in the hammer mills. Similar processing of rubber waste, when a mechanical shredder handles the deep-frozen rubber waste, is known for example from the document U.S. Pat. No. 5,735,471. Other technologies use for obtaining the grits the various types of mills. Both types of technologies require the prior removal of foot parts with the content of the steel wires, alternatively even cutting into smaller parts. This limits this technology for complex processing of used tyres.

Another procedure for the use of used tyres is in their combustion. A tyre is by its calorific value at the level of quality black coal, but by its mechanical composition, in particular the content of the steel reinforcements, it is for practical combustion for the purpose of obtaining energy, hard to use. A combustion furnaces for obtaining the heat water vapour, such as the Helnan-Freud's combustion furnace operating in Great Britain, allow you to burn the whole tyres, but only by batch way, since the removal of steel reinforcements from the furnace requires a shutdown of the device. The process therefore takes place by batch regime. A different and somewhat more modern method of tyre combustion arises from the system of oil burners and blowers, which, together with the rotary furnace, causes that the temperature rises in over 1300° C. and the steel sears and does not block the grates. The usability of such iron for recycling is sporadic.

A relatively trouble-free way to use tyres as a fuel is handled in the cement furnaces. Here the whole tyre will disappear and will be able to save other more expensive energy. The consumption of tyres in cement plants is, however, only a fraction of how many of them accumulate.

From the Czech utility model no. 20795 is further known a device for processing rubber waste, in particular tyres, by the physical-chemical process, which consists of at least one gas-tight chamber, into which by a feed pipe the aggressive gas is supplied, such as $O_3$, moistened by the water mist, formed through at least one nozzle, to which the pressure water is brought from the tank. In the gas-tight chamber there are in lines one above the other, opposite each other, placed the top cylinders and contradictory bottom cylinders with a space for processed rubber waste. One from the lines of the cylinder is fixed, while the second of the lines of cylinders is vertically movable with pressure. On the input side of the gas-tight chamber there is located the input area with the input cap and the on output side there is located the output space with the output cap, whereas both spaces are provided with the output pipe with a against-explosive safety lock for exhaust of gas and both are from the internal space of the gas-tight chamber separated by internal closures. The disadvantage of this device is, in particular, in its relative complexity.

From the point of view of current technology knowledge it could appear the use of pyrolysis to be the final solution. The competent pyrolysis reactor for waste processing, in particular of tyres, it is known for example from the documents US 2011116986 or from the documents WO 9320396.

Pyrolysis, as it is performed in these devices, however, requires both relatively gently crushed input raw material, if possible, without any foreign admixtures, and also the external heating of the reactor. It moves the economy to a large burden of its own costs on grinding, and heating, so that the products are created only hardly, or with a small rate of profit they are in position to make the operations economically self-sufficient.

SUMMARY OF THE INVENTION

The above disadvantages of the prior art are to a large extent removed by the device for the continuous processing of used or otherwise degraded tyres, consisting of a reactor for the thermal decomposition of these waste tyres into the organic decomposition products in the form of low molecular hydrocarbons, and residual inorganic waste shares, according to the present invention, whose essence consists in the fact that in the upper part of the reactor there is created a filling chamber with a pair of filling closures for filling its internal space by the waste tyres and in the bottom part of the reactor there is formed the output chamber of the residual inorganic shares with a pair of output closures, while in the lower part of the reactor there are arranged the nozzles for generating of a mild gaseous inert medium by oxidation of unreacted residues of organic matter, which in the course of the process, permeate the interior space of the reactor into its lower part. In the upper part of the inner space of the reactor under the filling chamber is then created at least one output opening of this inert gas media, which, together with the therein dispersed organic decomposed products in the form of aerosol, is led through the separator of solid particles and a cooler into a separator of liquid particles from the cooled aerosol. The separator of liquid particles is equipped with the first end output of the liquid particles into the tank and, second, between-operating output of the gaseous particles, which are led to the direct energy use by combustion in thermal machines or in a convenient implementation they are driven into the freezing chamber for the separation of gases with a condensing temperature above the temperature in this chamber, from which there is ended up the second end output of the remaining part in it non-condensed gases.

The essence of the invention consists further in the fact that the output chamber of the residual inorganic shares by a pair of output closures is located laterally outside of the axis of the reactor, while in the axis of the reactor there is at its bottom arranged the generator of gaseous inert medium and nozzles for generating of a gas inert medium are in its internal space connected to the pipe bearing the control valve for setting the passage of air from the external space of the reactor to exothermic heating of gaseous inert medium at the desired temperature. Also preferably, however, a reactor is at the same equipped with extrusion equipment for the disposal of residual inorganic shares from the bottom of the reactor into a laterally located output chamber. To facilitate the filling of the internal space of the reactor the reactor is preferably equipped with the conveyor of processed tyres to its filling chamber.

Thanks to a pair of filling closures of the filling chamber and a pair of output closures at the output chamber of residual inorganic shares, the thermal decomposition of processed tyres takes place in the reactor by non-access of the air, whereas it is guaranteed in it a perfect heat transfer to the processed waste and at the same time, guaranteed a perfect transfer of all emerging reaction products from its reaction space, and even in the course of the entire manufacturing process. The device according to the invention also allows other processing in the thermic decomposition of the resultant gaseous and liquid organic products for the purpose of their further use. An advantage of the device according to the invention is also the fact that the device allows the processing of whole used or otherwise degraded tyres without any previous adjustment.

DESCRIPTION OF THE DRAWINGS

The invention is further clarified by a schematic drawing of an exemplary implementation of a device for the continuous processing of used or otherwise degraded tyres according to the invention.

EXAMPLE OF EMBODIMENT OF THE INVENTION

Device for the continuous processing of used or otherwise degraded tyres according to the displayed exemplar implementation of the invention consists of a vertically arranged reactor 1 for the thermal decomposition of these waste tyres into the organic decomposition products in the form of low molecular hydrocarbons, and residual inorganic waste shares. In the upper part of the reactor 1 there is created a filling chamber 2 with a pair of filling closures 3 for filling its internal space by the waste tyres and in the bottom part of the reactor 1 there is formed the input chamber 8 of the residual inorganic shares with a pair of output closures 9.

In the lower part of the reactor 1 there are in its walls arranged the nozzles 5 for input of air for generating of a mild gaseous inert medium by oxidation of unreacted residues of organic matter from the treated tyres. The output chamber 8 of the residual inorganic shares by a pair of output closures 9 is located laterally outside of the axis of the reactor 1, while in the axis of the reactor 1 there is at its bottom arranged the generator of gaseous inert medium and nozzles for generating of a gas inert medium are in its internal space connected to the pipe bearing the control valve 6 for setting the passage of air from the external space of the reactor 1 to exothermic heating of gaseous inert medium at the desired temperature.

In the upper part of the inner space of the reactor 1 under the filling chamber 2 is then created an output opening 11 of this inert gas media, together with the therein dispersed organic decomposed products in the form of aerosol.

The device is further made up of a separator 12 of solid particles, mainly soot, into which the aerosol enters by the input opening 14 whereas the separator 12 is equipped with the double case 13 for its cooling by the air. By the output vent 15 then the aerosol without solid particles from the separator 12 goes out and is through the outlet opening 16 brought into the cooler 17, provided with a cooling circuit 18 with the flowing cooling water and outlet output 19 of cooled aerosol, which is through the supply input 20 brought into the separator 10 of the liquid particles.

The separator 10 of liquid particles is equipped with the first end output 21 of the liquid particles into the tank 22 and, second, a between-operating output 23 of the gaseous particles into the freezing chamber 24 for the separation of gases with a different condensing temperature, i.e. where by the decreasing of temperature from −20 to −40° C. separates the gases with condensation temperatures above the stated temperature.

The reactor 1 is also equipped with the conveyor 27 of processed tyres to its filling chamber 2 and with extrusion equipment 7 for the disposal of residual inorganic shares from the bottom of the reactor 1 into a laterally located output chamber 8.

The reactor 1 is after the filling of the processed tyres closed by at least one of the pair of filling closures 3 and by at least one of the pair of output closures 9. After the initial heating of processed tyres in the lower part of the reactor 1 by flame or by electrical heating to the operating temperature of 600° C. there starts the reaction which is carried by the commencement of the generation of a gas inert medium in generator 4 and by running the exhaust vent, which is part of the separator 10 of the liquid particles. By the control valve 6 there is set the passage of air to the oxidation of the content of the space around the generator 4, thereby the inert gaseous medium exothermically heats to a temperature whose value is governed by the flow rate of the air by the control valve 6. This medium then continues through the reactor 1 to the outlet opening 11 and thermically decomposes the tyres placed in this space, while the degradation products in a state of low molecular hydrocarbons are distributed in the medium in the form of aerosol.

The continuity of the process is provided in this device according to the invention by the fact that when the open top and the closed bottom of a pair of filling closures 3, the conveyor 27 will fill the filling chamber 2 of the reactor 1 by processed tyres, whereupon the upper of the pair of filling closures 3 closes. Then the content of the filling chamber 2 by opening the lower of a pair of filling closures 3 is put into the reactor 1. This mode of filling is repeated periodically in accordance with the consumption of the tyres inside the reactor 1. Similar it is in the case with a output of wires and inorganic wastes from the reactor 1, when during the open top and the closed bottom of the pair of output closures 9 by linear movement of extrusion equipment 7 these inorganic wastes are pushed out from the bottom of the reactor 1 into the space of the output chamber 8. Then by the closing of the upper and by the opening of the bottom of a pair of output closures 9, the content of the output chamber 8 gets out into the already non-illustrated container.

In this an exemplary implementation of the invention it is a reactor 1 with a square base of side 1 meter and a height of 4.5 meters, in which after processing 1426 kg of used tyres the following has been obtained: 626 liters of liquid fuels with a calorific value of EUR 34.3 MJ/kg, 170 kg of liquefied gas, 173 kg of iron and 137 kg of ash. As the gaseous inert medium there was used the medium that contained in the volume the amount of 64% of the nitrogen, 13.5% of carbon dioxide and 0.1% carbon monoxide, whereas the remainder was formed by the superheated water vapour, and whose temperature at the inlet to the reaction amounted to 620° C. and at the output 220° C.

INDUSTRIAL APPLICABILITY

Device for the continuous processing of used or otherwise degraded tyres can be widely used to effective waste management and to their complex or at least part assessment onto the further usable products, including the products suitable for the drive of the thermal machines and for production of heat.

LIST OF REFERENCE NUMBERS

1 Reactor
2 Filling chamber
3 Filling closures
4 Generator of the heating medium
5 Nozzles
6 Control valve
7 Extrusion equipment
8 Output chamber
9 Output closures
10 Separator of liquid particles
11 Output opening
12 Separator of solid particles
13 Double case
14 Input opening
15 Output vent
16 Input vent
17 Cooler
18 Cooling circuit
19 Outlet output
20 Supply input
21 First end output
22 Tank of liquid particles
23 Between-operating output
24 Freezing chamber
25 Second end output
26 Third end output
27 Conveyor

The invention claimed is:

1. A device for the continuous processing of waste tyres, said device comprising a reactor for the thermal decomposition of the waste tyres into organic decomposition products in the form of hydrocarbons and residual inorganic waste shares, wherein the reactor comprises a filling chamber comprising a first upper door, a first lower door, and an internal space formed between the first upper door and the first lower door, wherein the internal space of the filling chamber is configured to be filled with the waste tyres, wherein the reactor comprises an output chamber positioned under the filling chamber, wherein the output chamber comprises a second upper door and a second lower door, wherein the reactor comprises arranged nozzles for facilitating oxidation of unreacted residues of organic matter from processed tyres into a gaseous inert medium, wherein at least one output opening is formed under the filling chamber in the reactor, wherein the output opening is in fluid communication with a solids separator, a cooler, and a liquid separator, wherein the output opening is configured to direct the gaseous inert medium and dispersed organic decomposed products in the form of aerosol to the solids separator for removing solid particles therefrom, wherein the cooler is configured to cool the aerosol from the solids separator to form a cooled aerosol, wherein liquid separator comprises a first end output in fluid communication with a tank and an operating output in fluid communication with a freezing chamber, wherein the liquid separator separates the cooled aerosol into liquid particles and gaseous particles, wherein the liquid particles from the liquid separator are directed to the tank via the first output, wherein the gaseous particles from the liquid separator are directed to the freezing chamber via the operating output, wherein the freezing chamber condenses the gaseous particles to form non-condensable gases, wherein a portion of the non-condensable gases leave the freezing chamber via a second output, and wherein a portion of the non-condensable gases leave the freezing chamber via a third output.

2. The device according to claim 1, wherein the output chamber is located laterally outside of a longitudinal axis of the reactor, wherein an oxidation reaction space and the nozzles are positioned in a bottom internal space of the reactor, wherein the oxidation reaction space and the nozzles are in fluid communication with a pipe for a control valve, wherein the control valve governs the flow rate of air from an external space from the reactor into the reactor.

3. The device according to claim 2, wherein the reactor is equipped with an extruder for moving the residual inorganic shares from the reactor into the output chamber.

4. The device according to claim 1 wherein the reactor is equipped with a conveyor for conveying the processed tyres to the filling chamber.

* * * * *